United States Patent [19]

Murata

[11] Patent Number: 4,922,547
[45] Date of Patent: May 1, 1990

[54] MICROPHONE CIRCUIT
[75] Inventor: Yukio Murata, Tokyo, Japan
[73] Assignee: NEC Corporation, Japan
[21] Appl. No.: 132,480
[22] Filed: Dec. 14, 1987

[30] Foreign Application Priority Data

Dec. 15, 1986 [JP] Japan .................. 61-299246

[51] Int. Cl.$^5$ ............................. H04B 1/46
[52] U.S. Cl. ...................... 455/79; 455/80; 381/168
[58] Field of Search ............ 455/79, 95, 89, 78, 455/116, 127, 128, 82, 80, 83, 58; 379/420, 58; 381/168, 122; 370/6, 32

[56] References Cited

U.S. PATENT DOCUMENTS

| | | | |
|---|---|---|---|
| 3,191,066 | 10/1962 | Staudenmayer | 455/79 |
| 4,087,636 | 5/1978 | Akiyama et al. | 455/79 |
| 4,246,582 | 1/1981 | Kondo et al. | 455/79 |
| 4,400,581 | 8/1983 | Jacobson | 379/420 |
| 4,400,584 | 8/1983 | Vilmur | 455/79 |
| 4,457,018 | 6/1984 | Takayama | 455/79 |
| 4,549,309 | 10/1985 | Corrigan | 455/78 |
| 4,682,350 | 7/1987 | Akerberg | 379/58 |
| 4,720,856 | 1/1988 | Pace et al. | 379/420 |

Primary Examiner—Reinhard J. Eisenzopf
Assistant Examiner—Curtis Kuntz
Attorney, Agent, or Firm—Laff, Whitesel, Conte & Saret

[57] ABSTRACT

A microphone circuit for a mobile telephone is capable of operations in either of two modes, i.e. in a hands-free or a push-to-talk mode. A constant current circuit is coupled in parallel with the microphone to preclude a change in a DC bias voltage responsive to switch operations, especially in a push-to-talk mode. A voltage comparator compares the bias voltage with a reference to detect control signals and selects a preferred mode of operation.

5 Claims, 5 Drawing Sheets

MICROPHONE CIRCUIT

BACKGROUND OF INVENTION

This invention relates to a microphone circuit used for a mobile telephone or the like and more particularly, to a microphone circuit having a control switch for changing the communication mode of the telephone.

This kind of microphone circuit is, for example, employed for a mobile telephone designed to accommodate a hands-free mode in which a loudspeaker and microphone are used with subscriber's hands free and a press-to-talk mode in which the loudspeaker and microphone are used alternatively. In the hands-free mode, howling or singing may occur due to crosstalk either in a transformer of a telephone switching office or between the loudspeaker and microphone or both. In order to avoid the singing, the microphone circuit includes a control switch which is manually actuated when the singing occurs, to provide a mode switching signal for changing the hands-free mode in to the press-to-talk mode.

In the conventional microphone circuit, the control switch connects a parallel resistor to or disconnects it from the output of a microphone unit. If the control switch is turned on, the DC bias voltage for the microphone unit decreases by the virtue of the resistor. This decrease of bias voltage is detected by a voltage comparator. The detected output is used as a control signal of mode switching.

Upon turning on the control switch, however, the load impedance of the microphone unit of the conventional microphone circuit decreases due to the resistor, so that not only the bias voltage but also the output signal voltage of the microphone unit decreases. In order to solve this problem, it may be possible to amplify the decreased output of the microphone unit using an amplifier connected to the output terminal of the microphone circuit. This solution increases the circuit size. Moreover, since this solution causes the amplification of the bias voltage in addition to the output signal, the predetermined bias voltage must be again modified. This modification further causes the change of the load impedance of the microphone unit and, therefore, the amplification factor must be modified again. Consequently, it is difficult to adjust the bias voltage and the amplification factor properly.

Another solution of the above problem is to provide a detection signal line for indicating the on/off status of the control switch. However, it means that another signal wire lead must be added to the two-wire lead microphone unit, with the result that the advantage of the two-wire lead microphone unit disappears.

SUMMARY OF THE INVENTION

An object of the present invention is to provide a microphone circuit, wherein the status of the control switch for controlling the output of the control signal can be detected without a decrease in the output level of the microphone unit of two-wire leads.

Another object of the present invention is to provide a microphone circuit for both the hands-free mode and the press-to-talk mode of the mobile telephone.

In a device including a microphone circuit, the microphone circuit comprises microphone unit means operated by a DC bias voltage for providing a microphone output signal superposed on the DC bias voltage. A constant current source means is connectable in parallel with the microphone unit. First control switch means controls the parallel connection of the constant current source means to change the DC bias voltage. A voltage comparator means is connected in parallel with the microphone unit means for comparing the bias voltage with a predetermined reference voltage to detect the status of the control switch means and to provide a control signal.

BRIEF DESCRIPTION OF THE DRAWINGS

A better understanding of the invention will be obtained from the detailed description below, with reference to the accompanying drawings, in which.

DESCRIPTION OF THE PREFERRED EMBODIMENT

Figure 1:
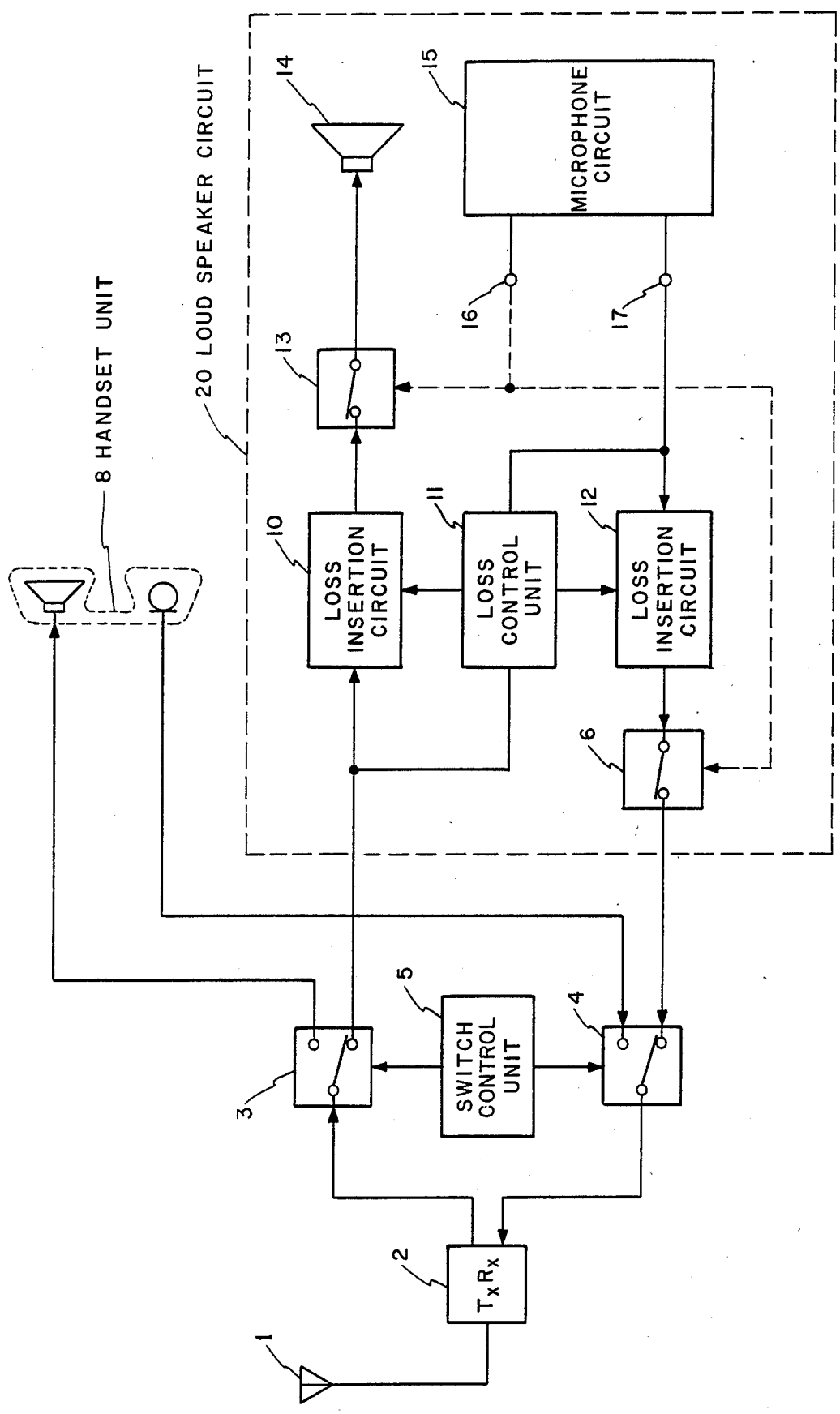
FIG. 1 is a block diagram of the mobile telephone system, to which, the microphone circuits of the present invention and the prior art are applicable.

Referring to FIG. 1, a transmission/reception antenna 1 is connected to a tranceiver (Tx Rx) 2, which in turn is connected to switches 3 and 4. The switches 3 and 4 connect the tranceiver 2 to either a handset unit 8 or a loudspeaker circuit 20 under the control of a control switch unit 5. The communication or conversation using the loudspeaker circuit 20 includes the aforementioned hands-free mode and press-to-talk mode. Since the communication using the handset unit 8 is usual in the mobile telephone system and is well-known in the art, the explanation thereof will be omitted.

The communication using the loudspeaker circuit 20 is performed in the following way. Suppose that the tranceiver 2 is connected to the loudspeaker circuit 20, as is shown in FIG. 1. A reception signal from the antenna 1 is fed sequentially to the tranceiver 2, switch 3, a loss insertion circuit 10, such as an attenuator, a switch 13, and finally a loudspeaker 14 from which the reception signal is output as a reception speech signal. On the other hand, a transmission speech signal from a microphone unit in a microphone circuit 15 is fed from a terminal 17 to a loss insertion circuit 12, and then transmitted, via switches 6 and 4 and the tranceiver 2, from the antenna 1 to a base station (not shown). Here, a loss control unit 11 controls the insertion loss given by the loss insertion circuits 10 and 12, to prevent the crosstalk between the speaker and the microphone. In the above explanation, it is assumed that both switches 6 and 13 are closed.

Now, it is assumed that the howling or singing occurs in the hands-free mode, due for example, to crosstalk in either a transformer in a telephone exchange office (not shown) or between the speaker 14 and the microphone circuit 15 or both. On this occasion, the subscriber manually closes a control switch contained in the microphone circuit for controlling the communication mode. The closed status of the control switch is applied from a terminal 16 to the switches 6 and 13. Consequently, the switches 6 and 13 are switched to operate in the press-to-talk mode. In other words, they are alternatively switched by the subscriber to operate in the press-to-talk mode communication.

Figure 6:
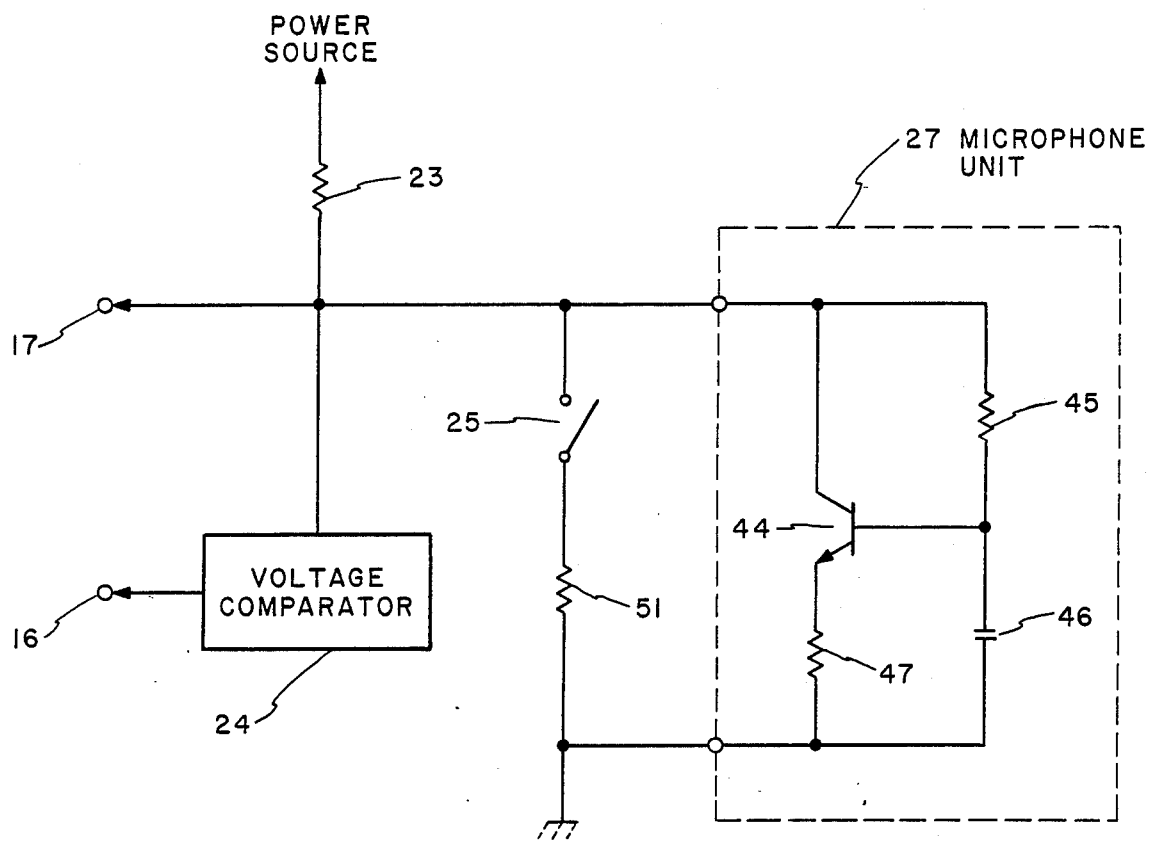
FIG. 6 is a schematic diagram of a microphone circuit according to the prior art.

In order to fully understand the present invention, the prior art microphone circuit will first be explained with reference to FIG. 6. In FIG. 6, a microphone unit 27 is a two-wire lead electret capacitor microphone, which is composed of a transistor 44, resistors 45 and 47, and a parallel plate capacitor 46 formed by a microphone vibrator plate. In response to a speech signal acting upon the vibrator plate 46, the microphone output is taken out from a terminal 17, to which a bias and load resistor 23 is connected. A serial connection of a resistor 51 and a control switch 25 is connected to the output of the microphone unit 17. When the control switch 25 is closed, the resistor 51 is inserted in parallel with the microphone unit 27, so that the DC bias voltage of the microphone unit 27 is reduced. This reduction is detected by a voltage comparator 24, output of which is taken out from a terminal 16 as a mode switching signal. The mode switching signal is used for switching from a hands-free mode to a press-to-talk mode in the system as is shown in FIG. 1.

This conventional microphone circuit has the following disadvantages. The output of the microphone unit 27 is taken from one end of bias and load resistor 23, that is, the terminal 17. Since this output is provided from the collector of the transistor 44 in the microphone unit 27, the load of the transistor 44, that is, the load of the unit 27 is affected by the insertion of the resistor 51, which occurs upon the closure of the control switch 25. Therefore, not only the DC bias voltage for the microphone unit 27, but also the microphone output signal at terminal 17, change due to the insertion of the resistor 51.

Figure 5A:
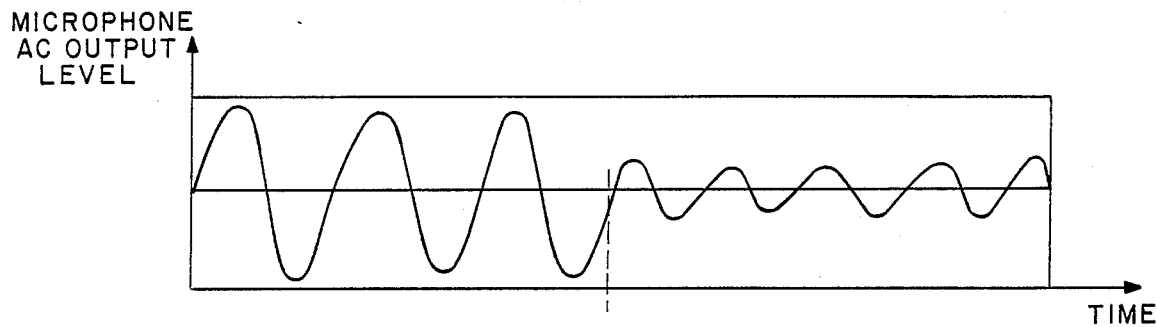
FIGS. 5A and 5B show the voltage waveforms of the outputs of the microphone units according to the prior art and the preferred embodiment of the invention, respectively.
Figure 7:
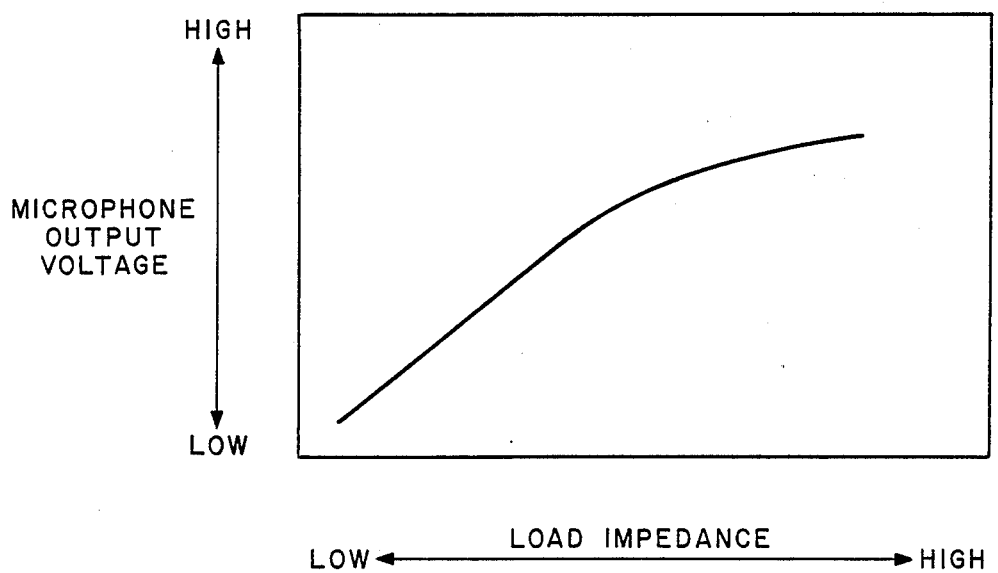
FIG. 7 graphically shows the relationship between the load impedance of the microphone unit shown in FIG. 6 and its output voltage.

In FIG. 7, the relationship between the load impedance of the microphone unit and its output voltage is shown. As can been seen from FIG. 7, the output voltage of the microphone unit varies with the load impedance which, in the prior art circuit of FIG. 6, changes in response to the closure of the control switch 25. As a result, the output voltage of the microphone unit 27 has a waveform as is shown in FIG. 5A. In FIG. 5A, when the control switch 25 (FIG. 6) is closed at time $t_1$, the output voltage of the microphone unit decreases. If this conventional microphone circuit is used in, for example, a mobile telephone, the transmission speech signal level decreases by closing the control switch 25 to switch the mode from hands-free to press-to-talk upon detection of the howling or singing.

In order to overcome this problem, it may be possible to amplify the decreased output voltage. However, this solution causes additional problems, such that the size of the circuit inevitably becomes large, as is mentioned above, and the adjustment of the bias voltage becomes complex. Also, another solution utilizes the detection wire lead for detecting the closure of the control switch but this solution, eliminates the advantage of the two-wire lead microphone unit.

Figure 2:
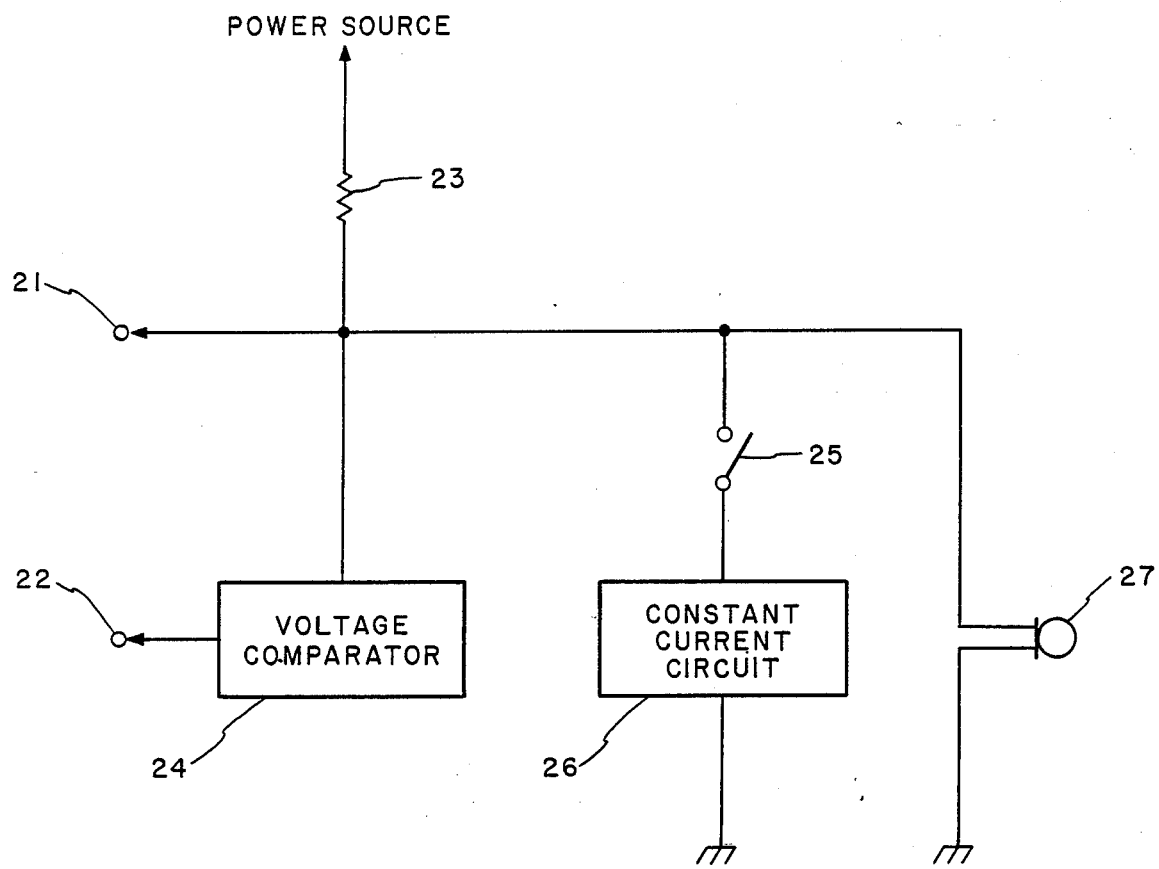
FIG. 2 is a schematic diagram of a microphone circuit according to a preferred embodiment of the present invention.

An object of the present invention is to overcome the above-mentioned disadvantages. FIG. 2 shows a microphone circuit according to a preferred embodiment of the present invention.

A bias voltage $V_1$ for a microphone unit 27 is applied from a power source via resistor 23. The reference or threshold voltage $V_0$ of a voltage comparator 24 is less than the bias voltage $V_1$ given by resistor 23. When the control switch 25 is closed, current flows through a constant current source 26 from the power source via resistor 23. The bias voltage of the microphone unit 27 decreases to a voltage $V_2$, which is lower than $V_1$ by the amount of the voltage drop of resistor 23. If the threshold voltage $V_0$ is higher than voltage $V_2$, the voltage comparator 24 provides a detected output at a terminal 22 upon closure of the control switch 25.

Since the internal impedance of the constant current source 26 is infinite, the load impedance of the microphone unit 27 does not change even with the closing of the control switch 25, with the result that the output level of the unit 27 does not change. Thus, the level reduction problem can be overcome.

Figure 3:
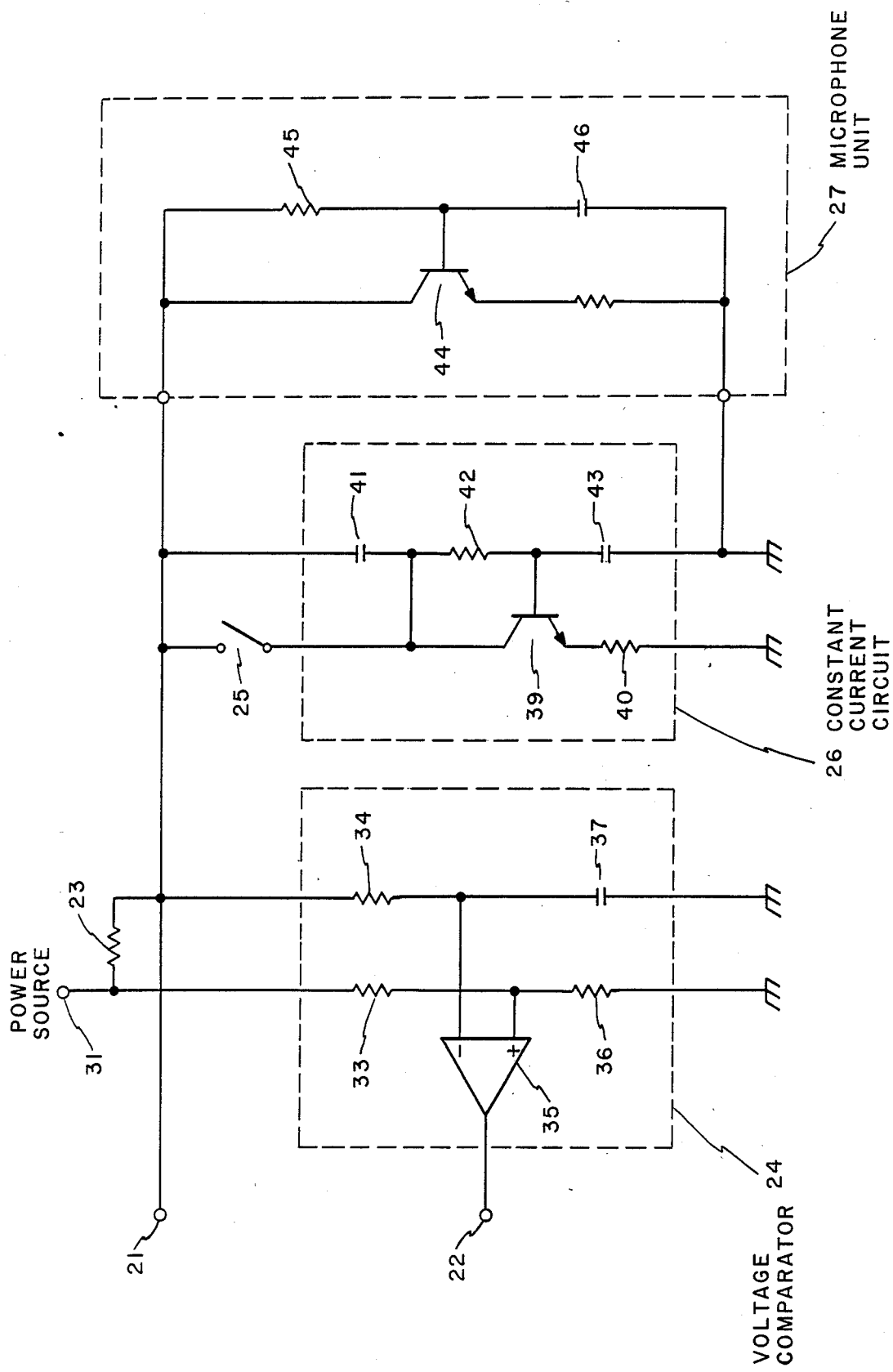
FIG. 3 is a detailed schematic diagram of the circuit shown in FIG. 2.

FIG. 3 shows the detailed schematic diagram of the circuit shown in FIG. 2. The construction of the microphone unit 27 is the same as the conventional unit shown in FIG. 6. The voltage comparator 24 is composed of an operational amplifier 35, a low-pass filter constituted by a resistor 34 and a capacitor 37, and a voltage divider constituted by resistors 33 and 36 to provide a reference voltage to the amplifier 35. The constant current source 26 is composed of capacitors 41 and 43, a transistor 39, and resistors 40 and 42. The capacitor 41 is a by-pass capacitor to absorb any noise which may be generated upon a closure of the control switch 25.

The bias voltage $V_1$ is supplied via resistor 23 to the microphone unit 27, the output of which is applied to the inverted terminal of the amplifier 35 by way of the low-pass filter composed of resistor 34 and capacitor 37. The reference voltage $V_0$ of the amplifier 35 is set by the voltage divider to be lower than the bias voltage $V_1$, and is applied to the non-inverted terminal. When the control switch 25 is closed, the DC voltage is applied to the base of the transistor 39 via the low-pass filter constituted by the resistor 42 and the capacitor 43. A constant current determined by this DC voltage and the emitter resistor 40 flows through transistor 39, by which current the bias voltage $V_2$ for the microphone unit 27 is decided. The reference voltage $V_0$ is chosen to be larger than the bias voltage $V_2$ to detect the change of status of the switch 25.

Figure 4:
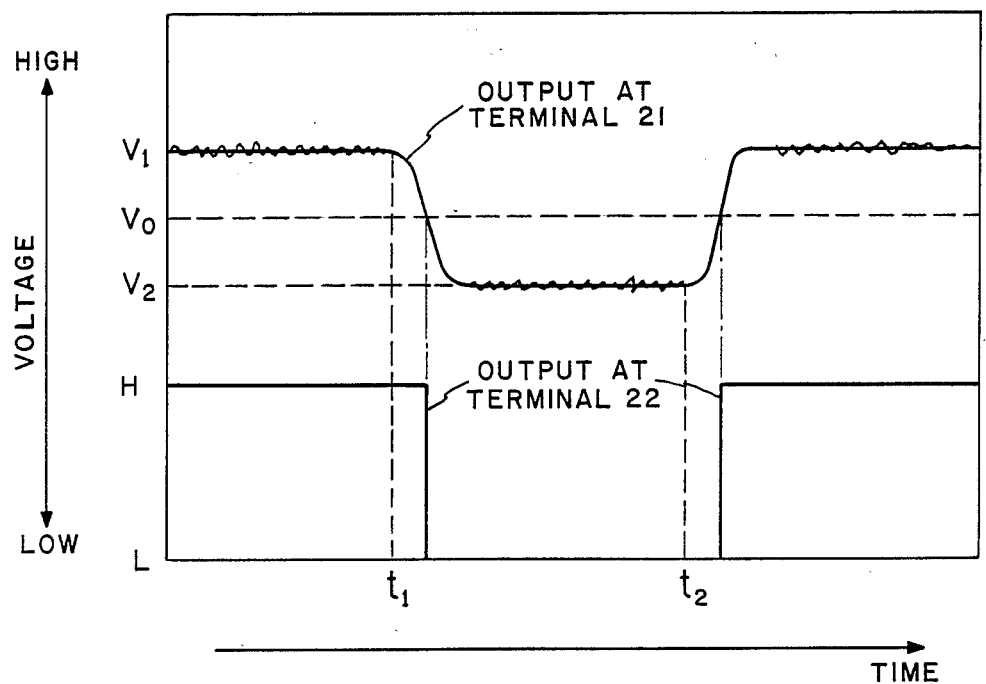
FIG. 4 is a graphical diagram for showing the voltage outputs of a microphone unit and a voltage comparator shown in FIG. 2.

FIG. 4 shows the voltage waveforms at microphone circuit output 21 and output terminal 22 of the voltage comparator 24 (FIG. 3). In this FIG. 4, the control switch 25 is open until time $t_1$ and the output voltage at microphone circuit output 21 is $V_1$ (the output speech signal is shown as being superposed on the bias voltage $V_1$) At time $t_1$, the control switch 25 is closed. The result is that, at an instant when the voltage at terminal 21 falls below the reference or threshold $V_0$, the output voltage at terminal 22 changes from a high level "H" to a low level "L". At time $t_2$, the control switch is opened. The voltage at terminal 21 increases from $V_2$ to $V_1$ with the time constant determined by the capacitor 41, the resistor 23 and the output impedance of the microphone unit 27. At the instant when the voltage at terminal 21 exceeds the threshold $V_0$, the voltage at terminal 22 changes from "L" to "H". Thus, the status of the control switch 25 is detected by the comparator 24. The terminals 21 and 22 of FIG. 4 correspond to the terminals 17 and 16 of FIG. 1, respectively.

Since the output impedance of the constant current source is theoretically infinite in comparison with the impedance of the microphone unit, the load impedance of the microphone unit 27 does not change even when the DC bias voltage of the unit 27 changes. Therefore, the output of the microphone at terminal 21 is not affected by the on/off status of the control switch 25.

Figure 5B:
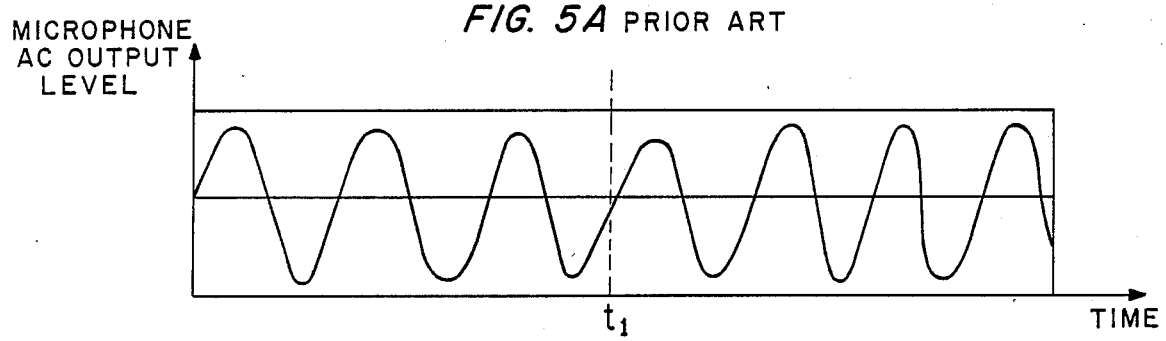

FIGS. 5A and 5B show the voltage waveforms of the microphone circuits of the prior arr and of a preferred embodiment of the present invention, respectively. It is to be noted in FIGS. 5A and 5B that the DC voltage is omitted for brevity's sake. As shown in FIG. 5A, if the control switch 25 is closed at time $t_1$, the output voltage of the prior art microphone circuit decreases as mentioned earlier, while it does not change in the circuit according to the preferred embodiment of the present invention as shown in FIG. 5B.

In case the preferred embodiment is used for the system shown in FIG. 1, the output voltage of the microphone circuit is not affected by the status of the control switch 25 on the press-to-talk mode.

In summary, the microphone circuit according to the present invention can detect the status of the control switch without a changing of the output voltage of the microphone circuit using two-wire lead microphone unit.

What is claimed is:

1. A microphone circuit comprising:
   microphone unit means operated by a DC bias voltage fed via an impedance means from a power source for providing a microphone output signal superposed on said DC bias voltage in response to a speech signal;
   constant current source means connectable in parallel with said microphone unit;
   switch means connected to said constant current source for manually controlling the parallel connection and disconnection of said constant current source means with said microphone unit means to change a current flowing through said impedance means, thereby changing said DC bias voltage; and
   voltage comparator means connected in parallel with said microphone unit means for comparing said bias with a predetermined reference voltage, thereby producing a control signal which is indicative of a voltage status of said switch means.

2. A microphone circuit as claimed in claim 1, wherein said microphone unit means comprised an electret capacitor microphone.

3. A microphone circuit as claimed in claim 1, wherein said impedance means comprises a resistor.

4. A radio telephone device including a microphone circuit comprising:
   microphone unit means operated by a DC bias voltage fed via an impedance means from a power source for providing a microphone output signal superposed on said DC bias voltage in response to a speech signal;
   constant current source means connectable in parallel with said microphone unit;
   first control switch means for manually controlling the parallel connection and disconnection of said constant current source means with said microphone unit means to change a current flowing through said impedance means, thereby changing said DC bias voltage;
   voltage comparator means connected in parallel with said microphone unit means for comparing said bias voltage with a predetermined reference voltage to detect a status of said first control switch means and for producing a control signal;
   second control switch means which is closed until a reception of said control signal from said voltage comparator unit means, said second control switch means being a press-to-talk switch for controlling a press-to-talk mode of communication after a reception of said control signal;
   transceiver means including a receiver for receiving, demodulating and amplfying a signal from a base station, and a transmitter for amplifying and modulating the output from said microphone unit means; and
   loudspeaker unit means for providing a reception speech output in response to the output of said receiver.

5. A method of detecting the status of a manual control switch without substantially affecting an output of a microphone unit which occurs responsive to a speech signal, said method comprising the steps of:
   applying a DC bias voltage from a power source via an impedance means to said microphone unit;
   connecting or disconnecting a constant current source with said microphone unit by operating said manual control switch to change current flowing through said impedance means, thereby changing said DC bias voltage, said constant current source being in parallel with said microphone when connected thereto; and
   detecting said changing of said DC bias voltage to output a control signal indicating the status of said control switch.

* * * * *